(12) United States Patent
Frost et al.

(10) Patent No.: US 6,410,120 B1
(45) Date of Patent: Jun. 25, 2002

(54) LAMINATED GLAZING

(75) Inventors: Thorsten Frost, Aachen (DE); Hasso Gien, Heerlen (NL); Manfred Jansen, Geilenkirchen (DE); Franz Krämling; Michael Labrot, both of Aachen (DE); Udo Matzerath, Wegberg (DE); Heinz Schilde, Würselen (DE)

(73) Assignee: Saint-Gobain Vitrage, Courbevoie (FR)

( * ) Notice: Subject to any disclaimer, the term of this patent is extended or adjusted under 35 U.S.C. 154(b) by 70 days.

(21) Appl. No.: 09/680,426

(22) Filed: Oct. 6, 2000

Related U.S. Application Data

(63) Continuation of application No. 09/488,536, filed on Jan. 21, 2000, now abandoned.

(30) Foreign Application Priority Data

Jan. 22, 1999 (DE) .......................................... 199 02 471

(51) Int. Cl.⁷ .............................. B32B 3/28; B32B 17/00
(52) U.S. Cl. ..................... 428/174; 428/192; 428/201; 428/209; 428/210; 428/432; 428/469
(58) Field of Search ............................ 428/34, 77, 78, 428/174, 192, 206, 207, 210, 2.1, 415, 416, 432, 433, 434, 436, 469, 472, 418

(56) References Cited

U.S. PATENT DOCUMENTS

| 4,277,294 A | * | 7/1981 | Orcutt ......................... 156/102 |
| 5,162,145 A | * | 11/1992 | Schaefer ....................... 428/209 |
| 5,796,071 A | * | 8/1998 | Morin et al. ................... 428/38 |

FOREIGN PATENT DOCUMENTS

| EP | 0 535 128 | 4/1993 |
| WO | WO 94/04357 | 3/1994 |

\* cited by examiner

Primary Examiner—Donald J. Loney
(74) Attorney, Agent, or Firm—Pennie & Edmonds LLP

(57) ABSTRACT

A curved, transparent laminated glazing is made of at least two fixed panes and of a multilayer laminate placed between them. The laminate includes at least one support film provided with a thin layer and with external adhesive layers, as well as with a marginal strip of an opaque material for delimiting the viewing area of the laminated glazing on at least one side. The support film, which extends over the viewing area, is cut to size according to the invention in such a way that its cut edge is still just covered by the marginal strip at least in a direction of viewing in transmission.

11 Claims, 1 Drawing Sheet

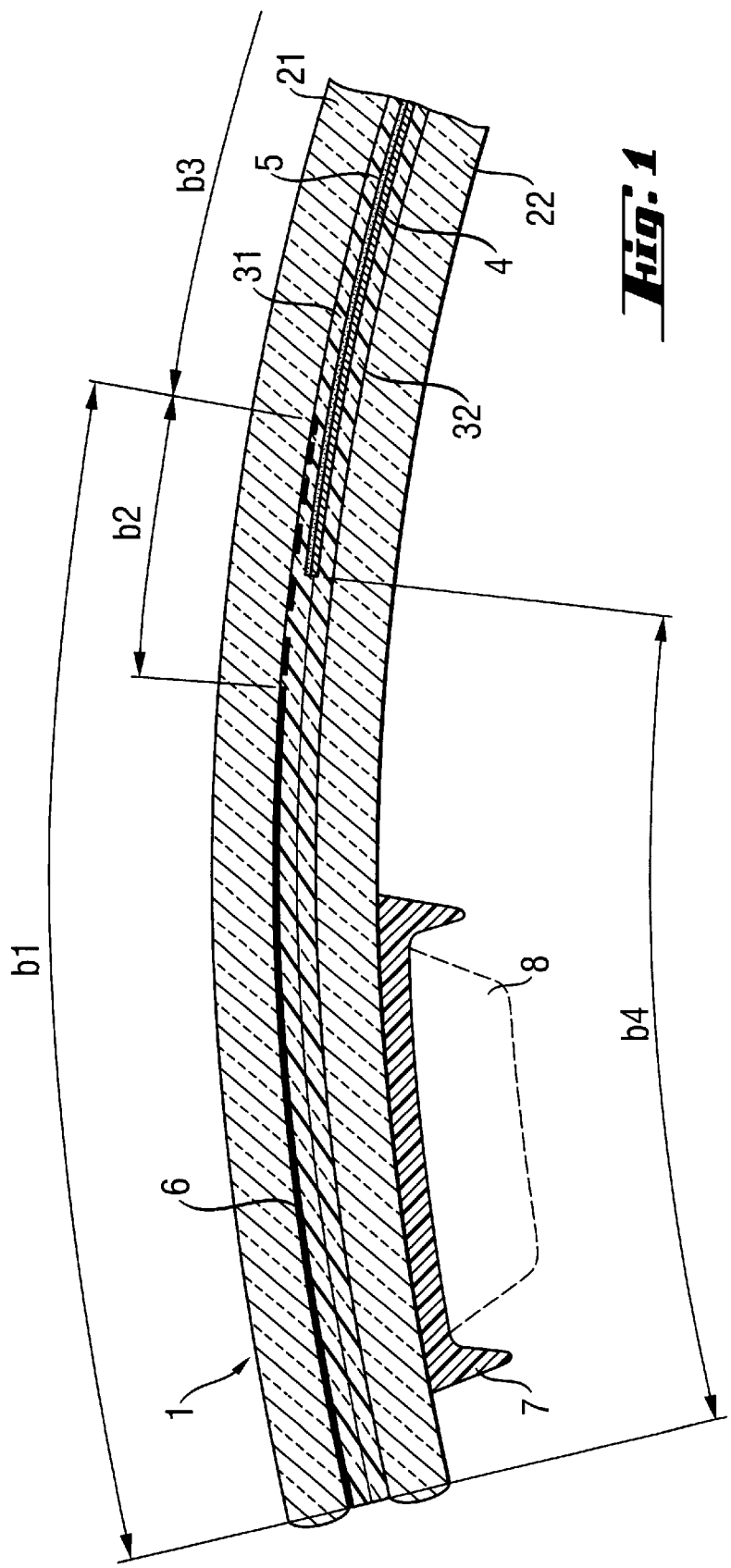

LAMINATED GLAZING

CROSS REFERENCE TO RELATED APPLICATIONS

This application is a continuation of the U.S. application Ser. No. 09/488,536 filed Jan. 21, 2000, now abandoned.

BACKGROUND OF THE INVENTION

The present invention relates to curved, transparent laminated glazing made of at least two fixed panes and of a multilayer laminate placed between them, consisting of at least one support film provided with a thin layer and with external adhesive layers, as well as with a marginal strip of an opaque material delimiting the viewing area of the laminated glazing on at least one side. Laminated glass glazing of this type is used in particular in thermally insulating or sun-screening windows or as heated windows in motor vehicles. For this purpose, the thin layer on the support film usually consists of a system of layers based on metallic silver sandwiched between dielectric layers. The external adhesive layers allow the parts and the support film to be adhesively bonded together so that, by using a suitable bonding process, laminated glazing is obtained. Using panes and corresponding intermediate layers, glazing made of laminated safety glass is obtained.

In order to manufacture glazing made of laminated safety glass, it is known, from document EP 0,535,128 B1, how to form, firstly, a multilayer prelaminate made of a first laminated layer, the support film being provided with a thin-layer system as well as with the second laminated layer in which the films are pressed against each other, aerated and prelaminated to each other by applying heat. The multifilm prelaminate is then placed between two panes, and the laminate consisting of the panes and the multifilm prelaminate is aerated and prelaminated. Next, the laminate is exposed to an increased temperature and to a high pressure, so that a laminated safety glass is obtained as the final laminate. In the case of slightly curved panes, this manufacturing process can be used without any great difficulty but, in the case of more pronounced curvatures, the support film often exhibits, in practice, wrinkling in the marginal region of the panes.

To solve this problem, document WO 94/04357 proposes, for example, to perform the prelaminate made from the support film and from at least one laminated layer in a special device which corresponds to the desired curvature of the pane. In so far as, for each bending operation, it is necessary to manufacture tailored moulds, this process requires a great deal of effort and is expensive. In addition, optical defects may appear in the laminated safety glass glazing manufactured when the panes and the prelaminate exhibit differences in curvature due to the tolerance or when the prelaminate and the panes have not been joined together in absolute concordance. Experience has shown that the greatest wrinkling occurs specifically in the regions of pronounced curvature which it is known lie along the outer edge of the laminated glazing.

SUMMARY OF THE INVENTION

The objective of the invention is to improve laminated glazing using the technique mentioned in the preamble so that the wrinkling of the support film is at least greatly reduced during assembly and bonding to the fixed panes and also requires no prebending step.

This objective is achieved according to the invention in that the support film, which extends over the viewing area, is cut to size in such a way that its cut edge is still just covered by the marginal strip at least in a direction of viewing in transmission. This means that the support film firstly does not extend at all into the marginal region of the laminated glazing with the smallest radii of curvature and that it thus cannot open out in this region either. On the other hand, it may also be sufficient to separate, by means of a notch, a strip of the support film located on the outside covered by the marginal strip, without removing the latter from the laminated product. In this way, mechanical decoupling is achieved; any wrinkling forming in the outer marginal region of the support film cannot package right into the viewing area. These effects have already been demonstrated by trials.

The laminated glazing according to the invention, therefore consists of at least two panes and of a prelaminate which join these panes together, which prelaminate is again composed of a support film with a thin-layer system and two adhesive layers or films enclosing the support film. An opaque material strip is applied on at least one side to at least one of the panes or films. In this way, the cut edge of the support film in the marginal region of the laminated glazing in this direction of viewing in transmission is at least partially covered, in which the opaque marginal strip lies within the series of isolated layers before the support film.

Given that the cut edge of the support film which clearly projects opposite the edges of the pane is covered by the coloured or non-transparent material of the marginal strip and given that, consequently, it is not visible or is only very barely visible, the laminated glazing also offers, apart from reduced wrinkling, a very pleasing appearance.

The opaque material in the region of the marginal strip should be understood to mean here not only a region absolutely impenetrable by light but also a region largely impenetrable to the human eye. Principally this involves optically covering the projecting cut edge of the support film in such a way that the observer does not find it disturbing.

The effect of reducing or preventing the wrinkling does not depend, of course, on the marginal strip itself, which means that the cut edge of the support film could also lie within the field of view. It would also be possible to provide a film cut in such a way in laminated glazing without a marginal region. However, a pane of this type does not meet the requirements of motor-vehicle manufacturers with regard to the appearance of laminated glazing.

The particular features of the dependent claims indicate advantageous improvements for this purpose.

In a preferred embodiment, the laminated glazing is delimited at the four corners by a marginal strip made of an opaque material. The cut edge of the support film is offset inwards approximately over the width of the marginal strip towards the inner surface of the pane, it being understood that the cut edge is still just covered by the marginal strip. When one or more edges of the laminated glazing are covered by other means, such as by an engine bonnet mounted above the lower edge of the laminated glazing as far as the viewing area, it not necessary also to provide this edge with a marginal strip. The question of knowing if the support film in the region of this edge has to be cut or recut, in order to avoid wrinkling, depends on the complexity of the curvature of the glazing.

In order to improve the appearance in the transition region between the marginal strips and the viewing area, a region of increasing transparency is generally provided. A region of this type may, for example, be obtained by applying coloration which decreases towards the middle of the glazing, or else by halftoning the opaque material, by decomposing, in a known manner, the marginal strip towards the viewing area in spots of decreasing size. When the marginal strip is placed on a pane or film surface which, when considered in the direction of viewing in transmission (for fitting the laminated glazing into a motor vehicle on the external side), lies behind the thin layer on the support film, the edge of the support film will be placed in the region of increasing transparency since, for the human eye, the different reflecting behaviour of the regions of the glazing is, with or without a thin layer, barely discernible in this way. On the other hand, if the marginal strip is placed on a pane or film surface which, when considered in the direction of viewing in transmission (again, from the outside), lies in front of the thin layer on the support film, the edge of the support film will be placed in the region of even density of the marginal strip. In this way, substantially greater tolerances when cutting to size and when positioning the support film may be allowed.

The isolated fixed panes of the laminated glazing may equally well be made of glass or of plastic. When the panes are made of glass, the usual process for producing the opaque marginal strip involves the screen-printing of a firing paint for producing a ceramic, which paint is fired at the same time as the pane-bending process.

In the case of the multilayer laminate, a support film made of PET (polyethylene terephthalate) with a double-sided adhesive film of PVB (polyvinyl butyral) is tested. This laminate may be composed, in this case, of what is called a double layer, which consists of a prelaminate of an adhesive PVB film and of the support film, given that the thin layer is placed on the inside of this laminated product and of another PVB film. However, it is also possible to use what is called a triple layer, which consists of a prelaminate made of the support film coated on both sides with an adhesive PVB film.

In the double layer cut to size around the outline of the laminated glazing, the desired outline of the support film is cut with a special tool, without slitting the PVB film. The cut edge of the support film can then be removed and the laminate may be completed with the second PVB film cut to size around the outline of the pane. However, the cut-out part of the support film may, in principle, also retain its position, since, because of the cut, there is mechanical decoupling and consequently any wrinkling in the viewing area of the laminated glazing is also prevented.

When a triple layer is used, cut to size around the outline of the laminated glazing, this triple layer is also cut with a special tool along the desired outline of the support film in such a way that the upper PVB film and the support film are slit, while the lower PVB film remains intact. The cut edge can then be removed. It is even possible to extract only the support film from the laminate after the cut has been made transversely towards the outer boundary. However, the edge of the support film with the upper PVB film adhering to it may also retain its position since, also in this case, there is mechanical decoupling because of the cut. When, however, as marginal strip, the support film is removed together with the upper PVB film, it may be advantageous to insert additional strips of PVB films over the thickness in the surface, using the technique of a frame for completing the cut marginal strip. This proves to be particularly necessary when the thickness differences are too great for uniform adhesive bonding.

BRIEF DESCRIPTION OF THE DRAWINGS

Further details and advantages of the aim of the invention result, without implying any limitation, from the drawing of an illustrative example and from the following description given below, in which:

FIG. 1 shows one embodiment of the laminated glazing in a simplified sectional view, this not being to scale in the region of one edge of the glazing.

DETAILED DESCRIPTION OF THE PREFERRED EMBODIMENTS

According to FIG. 1, the laminated glazing 1 consists of two spherically curved panes 21 and 22 about 1 mm to 2.5 mm in thickness, which panes are connected together by adhesive films 31 and 32 and thus form glazing made of laminated safety glass for use in motor vehicles. Placed between the two adhesive films 31 and 32 of polyvinyl butyral (PVB), the thickness of each of which amounts to about 0.38 mm to 0.76 mm, is a thin support film 4 of polyethylene terephthalate (PET) having a thickness of about 25 $\mu$m to 50 $\mu$m, which support film is in turn provided on one side with a thin layer 5. The thin layer 5, may, for example, be a multilayer system known as a transparent thermal insulation layer made of two layers of metallic silver each sandwiched between dielectric layers. The prelaminates made of a coated PET film and of one or two adhesive PVB films are manufactured as a continuous laminated films and can be obtained on a roll.

The pane 21 is, on its concave surface, in the marginal region b1, coated with a black firing paint 6 for producing a ceramic. The marginal region b1, having a total width of about 40 mm, runs into a partial region b2, having an approximate width of 10 mm towards the viewing area b3 of the laminated glazing 1, in halftoning.

A coating of this type, with a firing paint 6 for producing a ceramic, is also necessary and usual when the laminated glazing 1 is adhesively bonded, in a known manner, directly into a motor-vehicle body and, in this case, for protecting the adhesive materials from deleterious ultraviolet radiation. Considered from the external side under the light-impermeable region b1-b2, a prior coating 7 of polyurethane or of a suitable thermosetting plastic is extruded onto the free surface of the pane 22, for example in the manner known for preparing for bonding. The prior coating 7 is described herein a simplified manner as being a profiled strip without the usual moulded sealing lips. When regard to the adhesive bonding proper, it is then merely a question in the fitting operation of applying a bead of adhesive 8 onto the prior coating 7 and of placing the laminated glazing 1 in the body opening. The support film 4 extends over the entire viewing area b3 of the laminated glazing 1 and its cut edge stops beneath the region b2. The rear cut, on the side facing the edge b4, of the support film 4 therefore amounts to 30–40 mm at this point.

The cut in the support film for preventing wrinkling will in all cases clearly lie offset inwards by more than 10 mm with respect to each external edge of the glazing.

The manufacture, using the technique of producing a laminated glazing 1 of this type, requires the following steps. The panes 21 and 22 are cut and their edges polished, and then a firing paint 6 for producing a ceramic is screen-printed onto that surface of the pane 21 which later will lie on the inside. The two panels 21 and 22 are bent by a known process into their final shape, it being understood that the screen-printed edge is fired at the same time. A prelaminate made definitively from the PVB adhesive film 31 and from the support film 4 with the functional layer 5 sandwiched between them is cut to size around the outline of the laminated glazing. The support film 4 is then cut in such a way that the surface of the support film lying on the inside of the cut edge covers the entire viewing area of the laminated glazing 1, but such that the cut edge itself lies, however, in the halftoning region b2. After the outer edge of the support film has been demounted, it is possible to place the PVB film 32, which corresponds to the dimensions of the laminated glazing 1, on the support film. The panes and the films are joined together in the laminated product, in a manner which corresponds to their definitive position, and joined together beforehand and definitively by standard processes with the application of heat and pressure. During these processes, the PVB films 31 and 32 melt so that the panes 21 and 22 are adhesively bonded to each other and also so that sealing it guaranteed in the region b4. In particular, a still persistent slit is in this case closed up first by the rear cut of the support film 4. There then follows again the extrusion of a prior coating 7 on the inner surface of the laminated glazing 1.

What is claimed is:

1. A curved and transparent laminated glazing made of at least two fixed panes and of a multilayer laminate placed between them, the multilayer laminate including at least one support film provided with a thin layer and with external adhesive layers, as well as with a marginal strip of an opaque material delimiting the viewing area of the laminated glazing on at least one side, wherein the support film which extends over the viewing area is cut to size to provide a cut edge which is covered by the marginal strip at least in a direction of viewing in transmission.

2. The laminated glazing according to claim 1, wherein viewing area of the glazing is delimited by the marginal strip on at least two sides and in that the cut edge of the support film is offset inwards on these sides by approximately the respective width of the marginal strip facing the outer edge of the glazing.

3. The laminated glazing according to claim 1, wherein said marginal strip comprises a transition region whose transparency gradually increases towards the viewing area of the pane and in that the cut edge of the support film lies at least under the transition region at least in a direction of viewing in transmission.

4. The laminated glazing according to claim 3, wherein the transition region is made in the form of halftoning.

5. The laminated glazing according to claim 1, wherein at least one of the panes is made of glass and in that the opaque material of the marginal strip is a firing paint for producing a ceramic, applied to at least one surface of a pane using a screen printing process.

6. The laminated glazing according to claim 1, wherein at least one of the panes is made of plastic.

7. The laminated glazing according to claim 1, wherein at least one of the films of the laminate is provided with a marginal strip made of opaque material.

8. The laminated glazing according to claim 1, wherein said multilayer laminate includes a coated PET support film and PVB adhesive layers which are provided on opposite sides of the support film.

9. The laminated glazing according to claim 1, wherein the thin layer is made of silver, as a layer system with at least one functional layer.

10. The laminated glazing according to claim 9, wherein the functional layer is a thermally insulating layer.

11. The laminated glazing according to claim 2, wherein viewing area is delimited by the marginal strip on all sides of the glazing.

* * * * *